US012170354B2

(12) United States Patent
Jin et al.

(10) Patent No.: US 12,170,354 B2
(45) Date of Patent: Dec. 17, 2024

(54) METHOD OF PREPARING LITHIUM SECONDARY BATTERY

(71) Applicant: LG ENERGY SOLUTION, LTD., Seoul (KR)

(72) Inventors: Gui Long Jin, Daejeon (KR); Seung He Woo, Daejeon (KR); Hyo Sik Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 754 days.

(21) Appl. No.: 17/329,631

(22) Filed: May 25, 2021

(65) Prior Publication Data

US 2021/0280917 A1 Sep. 9, 2021

Related U.S. Application Data

(63) Continuation of application No. PCT/KR2019/016401, filed on Nov. 26, 2019.

(30) Foreign Application Priority Data

Nov. 26, 2018 (KR) ........................ 10-2018-0147161

(51) Int. Cl.
*H01M 10/0585* (2010.01)
*H01M 4/131* (2010.01)
(Continued)

(52) U.S. Cl.
CPC ....... *H01M 10/0585* (2013.01); *H01M 4/131* (2013.01); *H01M 4/134* (2013.01);
(Continued)

(58) Field of Classification Search
CPC ....... H01M 10/0525; H01M 2004/027; H01M 10/0566; H01M 10/058; H01M 10/0585;
(Continued)

(56) References Cited

U.S. PATENT DOCUMENTS

2008/0070120 A1   3/2008   Miyawaki et al.
2014/0011101 A1   1/2014   Ma et al.
(Continued)

FOREIGN PATENT DOCUMENTS

CN   108336293 A   7/2018
CN   108695548 A   10/2018
(Continued)

OTHER PUBLICATIONS

International Search Report issued in PCT/KR2019/016401 (PCT/ISA/210), dated Mar. 9, 2020.
(Continued)

*Primary Examiner* — Thiem D Phan
(74) *Attorney, Agent, or Firm* — Birch, Stewart, Kolasch & Birch, LLP (57) ABSTRACT

A method of preparing a lithium secondary battery is provided which may effectively perform pre-lithiation, wherein, a closed square band-shaped lithium foil having an opening formed at a center thereof is prepared during the preparation of the lithium secondary battery, and a negative electrode is disposed in the opening of the lithium foil, but pre-lithiation of the negative electrode may be performed without a separate pre-lithiation process by disposing the negative electrode and the lithium foil so as not to overlap with each other and disposing a negative electrode tab so as to be in contact with the lithium foil.

6 Claims, 5 Drawing Sheets

(51) Int. Cl.

| | | |
|---|---|---|
| *H01M 4/134* | (2010.01) | |
| *H01M 4/139* | (2010.01) | |
| *H01M 10/0525* | (2010.01) | |
| *H01M 10/0562* | (2010.01) | |
| *H01M 50/409* | (2021.01) | |
| *H01M 50/491* | (2021.01) | |
| *H01M 50/531* | (2021.01) | |
| *H01M 4/02* | (2006.01) | |

(52) U.S. Cl.
CPC ....... *H01M 4/139* (2013.01); *H01M 10/0525* (2013.01); *H01M 10/0562* (2013.01); *H01M 50/409* (2021.01); *H01M 50/491* (2021.01); *H01M 50/531* (2021.01); *H01M 2004/027* (2013.01); *H01M 2300/0068* (2013.01); *H01M 2300/0082* (2013.01); *Y10T 29/49115* (2015.01)

(58) Field of Classification Search
CPC .. H01M 4/0459; H01M 4/139; H01M 50/409; H01M 4/382; Y10T 29/49115
USPC .................................. 29/623.5, 623.1, 623.2
See application file for complete search history.

(56) References Cited

U.S. PATENT DOCUMENTS

| | | |
|---|---|---|
| 2014/0234732 A1 | 8/2014 | Park et al. |
| 2016/0087249 A1 | 3/2016 | Asano et al. |
| 2016/0380320 A1 | 12/2016 | Park et al. |
| 2018/0205112 A1 | 7/2018 | Thomas-Alyea et al. |
| 2018/0287209 A1 | 10/2018 | Hasegawa et al. |
| 2019/0229380 A1 | 7/2019 | Son et al. |
| 2019/0305298 A1 | 10/2019 | Chae et al. |
| 2020/0321584 A1 | 10/2020 | Jung et al. |

FOREIGN PATENT DOCUMENTS

| | | | |
|---|---|---|---|
| JP | 2000-182671 A | 6/2000 | |
| JP | 2004303597 | * 10/2004 | ............. Y02E 60/10 |
| JP | 2007-180039 A | 7/2007 | |
| JP | 2008-98151 A | 4/2008 | |
| JP | 2008-140705 A | 6/2008 | |
| JP | 2012-9209 A | 1/2012 | |
| JP | 2018-181451 A | 11/2018 | |
| KR | 10-2014-0006639 A | 1/2014 | |
| KR | 10-2014-0104152 A | 8/2014 | |
| KR | 10-2016-0040020 A | 4/2016 | |
| KR | 10-2018-0057513 A | 5/2018 | |
| KR | 10-2018-0084681 A | 7/2018 | |
| KR | 10-2018-0103734 A | 9/2018 | |
| WO | WO 2018/212453 A1 | 11/2018 | |

OTHER PUBLICATIONS

Extended European Search Report for European Application No. 19888855.4, dated Nov. 25, 2021.

* cited by examiner

METHOD OF PREPARING LITHIUM SECONDARY BATTERY

CROSS-REFERENCE TO RELATED APPLICATIONS

This application is a Continuation of PCT International Application No. PCT/KR2019/016401, filed on Nov. 26, 2019, which claims priority under 35 U.S.C. 119(a) to Patent Application No. 10-2018-0147161, filed in the Republic of Korea on Nov. 26, 2018, all of which are hereby expressly incorporated by reference into the present application.

TECHNICAL FIELD

Technical Field

The present invention relates to a method of preparing a lithium secondary battery which may effectively perform pre-lithiation, and more particularly, to a method of preparing a lithium secondary battery in which a closed square band-shaped lithium foil having an opening formed at a center thereof is prepared during the preparation of the lithium secondary battery and a negative electrode is disposed in the opening of the lithium foil, but pre-lithiation of the negative electrode may be performed without a separate pre-lithiation process by disposing the negative electrode and the lithium foil so as not to overlap with each other and disposing a negative electrode tab so as to be in contact with the lithium foil.

Background Art

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

A metal oxide, such as $LiCoO_2$, $LiMnO_2$, $LiMn_2O_4$, or $LiCrO_2$, is being used as a positive electrode active material constituting a positive electrode of a lithium secondary battery, and metallic lithium, a carbon-based material, such as graphite or activated carbon, or a material, such as silicon oxide (SiOx), is being used as a negative electrode active material constituting a negative electrode. Among these negative electrode active materials, the metallic lithium has initially been mainly used, but, recently, the carbon-based material has been mainly used, because a phenomenon occurs in which the battery is destroyed by damage of a separator which is caused by the growth of lithium atoms on the surface of the metal lithium as charge and discharge cycles proceed. However, with respect to the carbon-based material, it is disadvantageous in that its capacity is small because its theoretical capacity is only about 372 mAh/g, and thus, various studies have been conducted to replace the carbon-based material by using a silicon (Si)-based material with high theoretical capacity (4,200 mAh/g) as a negative electrode active material.

Charge and discharge of the lithium secondary battery is performed while a process of intercalating and deintercalating lithium ions from the positive electrode active material of the positive electrode into and out of the negative electrode active material of the negative electrode is repeated.

Theoretically, lithium intercalation and deintercalation reactions in the negative electrode active material are completely reversible, but, actually, more lithium is consumed than theoretical capacity of the negative electrode active material, and only a portion of the lithium is recovered during discharge. Thus, after a second cycle, a smaller amount of lithium ions is intercalated during charge, but most of the intercalated lithium ions are deintercalated during discharge. Thus, a difference in capacity between the first charge and discharge reactions is referred to as an irreversible capacity loss, and, since a commercially available lithium secondary battery is prepared in a state in which lithium ions are supplied from the positive electrode and lithium is not present in the negative electrode, it is important to minimize the irreversible capacity loss during initial charge and discharge.

It is known that this initial irreversible capacity loss is mainly caused by an electrolyte decomposition reaction on a surface of the negative electrode active material, and an SEI (Solid Electrolyte Interface) is formed on the surface of the negative electrode active material by an electrochemical reaction due to the electrolyte decomposition. Since a large amount of lithium ions is consumed in the formation of the SEI, there is a limitation in that the irreversible capacity loss is caused, but the SEI formed at an initial stage of charging may prevent a reaction of the lithium ions with the negative electrode or other materials during charge and discharge and may act as an ion tunnel that only passes the lithium ions, and thus, the SEI contributes to the improvement of cycle characteristics of the lithium secondary battery by suppressing the further electrolyte decomposition reaction.

Therefore, there is a need for a method to improve the initial irreversibility caused by the formation of the SEI, and one of such methods includes a method of allowing a side reaction generated during the first charge to occur in advance by performing pre-lithiation before the preparation of the lithium secondary battery. As described above, in a case in which the pre-lithiation is performed, when the actually prepared secondary battery is charged and discharged, since the first cycle is performed in a state in which the irreversibility is reduced accordingly, it is advantageous in that the initial irreversibility may be reduced.

A conventional pre-lithiation method, for example, may include a method of depositing lithium on a negative electrode or a method of directly contacting the negative electrode with lithium. However, the method of depositing lithium is disadvantageous in that, in order to deposit lithium on the negative electrode, it is expensive to set an apparatus for deposition and, in mass production, processability is poor due to the time required.

Accordingly, there is a need to develop a new negative electrode for a lithium secondary battery in which more effective pre-lithiation may be performed.

In order to develop a lithium secondary battery having improved safety, there is also a need to develop a battery in which a solid electrolyte is used instead of a conventional liquid electrolyte.

PRIOR ART DOCUMENT

Patent Document (Patent Document 1) KR2014-0104152 A

DISCLOSURE OF THE INVENTION

Technical Problem

An aspect of the present invention provides a method of preparing a lithium secondary battery in which pre-lithiation may be performed without performing a separate pre-lithiation process.

Technical Solution

According to an aspect of the present invention, there is provided a method of preparing an all-solid lithium secondary battery which includes:
preparing a negative electrode by forming a negative electrode active material layer including a first solid electrolyte on opposite surfaces of a current collector, the negative electrode having a negative electrode tab;
preparing a lithium foil having an opening formed at a center thereof and having a closed band shape, in which lithium is coated on one surface or opposite surfaces of a copper foil;
disposing the negative electrode in the opening of the lithium foil such that the negative electrode does not to overlap the lithium foil except for the negative electrode tab, which contacts the lithium foil, and preventing a portion, where the negative electrode tab and the lithium foil are in contact with each other, from being coated with the lithium;
applying a second solid electrolyte to at least one surface of a structure formed after disposing the negative electrode in the opening of the lithium foil;
disposing a positive electrode including a third solid electrolyte on the second solid electrolyte to form a stack; and
casing the stack.

According to another aspect of the present invention, there is provided a method of preparing a lithium secondary battery which includes:
preparing a negative electrode by forming a negative electrode active material layer on opposite surfaces of a current collector, the negative electrode having a negative electrode tab;
preparing a lithium foil having an opening formed at a center thereof and having a closed band shape, in which lithium is coated on one surface or opposite surfaces of a copper foil;
disposing the negative electrode in the opening of the lithium foil such that the negative electrode does not to overlap the lithium foil except for a negative electrode tab, which contacts the lithium foil, and preventing a portion, where the negative electrode tab and the lithium foil are in contact with each other, from being coated with the lithium;
disposing a separator on at least one surface of a structure formed after disposing the negative electrode in the opening of the lithium foil;
disposing a positive electrode on the separator to form a stack; and
accommodating the stack in a battery case, and injecting a liquid electrolyte into the battery case.

Advantageous Effects

In the present invention, since lithium of a lithium foil layer moves to an active material layer of a negative electrode without a complicated pre-lithiation process to easily cause pre-lithiation, the negative electrode prepared according to a preparation method of the present invention may secure initial reversibility, and thus, electrochemical performance of a lithium secondary battery may be improved.

MODE FOR CARRYING OUT THE INVENTION

Hereinafter, the present invention will be described in more detail with reference to drawings.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing a lithium secondary battery according to the present invention includes the steps of: preparing a negative electrode, preparing a lithium foil having an opening formed at a center thereof and having a closed band shape, in which lithium is coated on one surface or both surfaces of a copper foil, disposing the negative electrode in the opening of the lithium foil, but disposing the negative electrode so as not to overlap the lithium foil except for a negative electrode tab, disposing the negative electrode tab so as to be in contact with the lithium foil, and preventing a portion, where the negative electrode tab and the lithium foil are in contact with each other, from being coated with the lithium, applying a solid electrolyte to or disposing a separator on at least one surface of a structure thus formed, disposing a positive electrode on the solid electrolyte or the separator, and accommodating a stack thus prepared in a battery case.

A lithium secondary battery according to the present invention may be an all-solid lithium secondary battery or a lithium secondary battery using a liquid electrolyte.

Hereinafter, the method of preparing a lithium secondary battery according to the present invention will be described in detail.

Negative Electrode and Method of Preparing the Negative Electrode

A negative electrode 100 of the present invention includes:

a negative electrode collector, a negative electrode active material layer 102 formed on both surfaces of the negative electrode collector, and a negative electrode tab 106 protruding from the collector.

Each negative electrode active material layer 102 formed on the both surfaces of the negative electrode collector may be formed in a ratio of 1:3 to 300 relative to a thickness of the negative electrode collector, and may generally be formed to a thickness of 50 µm to 2,000 µm. In a case in which the thickness of the negative electrode active material layer 102 is formed in a ratio less than 1:3 relative to the thickness of the negative electrode collector, capacity may be excessively small, and, in a case in which the thickness of the negative electrode active material layer 102 is formed in a ratio greater than 1:300 relative to the thickness of the negative electrode collector, since battery resistance is increased, smooth charge and discharge may not be performed.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and microscopic irregularities may be formed on the surface of the collector to improve the adhesion of a negative electrode active material. The negative electrode collector, for example, may be used in various forms such as that of a film, a sheet, a foil, a net, a porous body, a foam body, a non-woven fabric body, and the like.

The negative electrode may be prepared by a method in which a negative electrode slurry is prepared by dissolving or dispersing a negative electrode active material, a conductive agent and/or a binder in a solvent, and both surfaces of the negative electrode collector are coated with the negative electrode slurry and then pressed.

The negative electrode active material may include at least one selected from the group consisting of: carbon-based material: at least one selected from the group consisting of silicon (Si), tin (Sn), aluminum (Al), antimony (Sb), and zinc (Zn) or an oxide thereof; and a metal oxide selected from the group consisting of $Co_{x1}O_{y1}$ ($1 \le x1 \le 3$, $1 \le y1 \le 4$), $Ni_{x2}O_{y2}$ ($1 \le x2 \le 3$, $1 \le y2 \le 4$), $Fe_{x3}O_{y3}$ ($1 \le x3 \le 3$, $1 \le y3 \le 4$), $TiO_2$, $MoO_2$, $V_2O_5$, and $Li_4Ti_5O_{12}$.

For example, the negative electrode active material is a mixed negative electrode active material of a silicon-based negative electrode active material and a carbon-based negative electrode active material, wherein the negative electrode active material may include the silicon-based negative electrode active material and the carbon-based negative electrode active material in a weight ratio of 1:99 to 50:50, for example, 5:95 to 20:80.

If the silicon-based negative electrode active material is included in an amount of less than the above range, since an increase in energy density is difficult, it may be difficult to achieve a high-capacity battery, and, if the silicon-based negative electrode active material is included in an amount of greater than the above range, a degree of volume expansion of the negative electrode may be increased.

The negative electrode active material may be included in an amount of 80 wt % to 99 wt %, for example, 85 wt % to 98 wt % based on a total weight of the negative electrode active material layer. When the negative electrode active material is included within the above-described amount range, excellent capacity characteristics may be exhibited.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be included in an amount of 0 wt % to 30 wt % based on the total weight of the negative electrode active material layer.

Also, the binder improves adhesion between negative electrode active material particles and adhesion between the negative electrode active material and the current collector.

Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the negative electrode active material layer.

The solvent used in the preparation of the negative electrode slurry may be a solvent commonly used in the art, and, for example, dimethyl sulfoxide (DMSO), isopropyl alcohol, N-methylpyrrolidone (NMP), acetone, or water may be used alone or a mixture thereof may be used. An amount of the solvent used may be appropriately adjusted in consideration of a coating thickness of the slurry, manufacturing yield, and viscosity.

In a case in which the negative electrode is used as a negative electrode of an all-solid lithium secondary battery, a solid electrolyte (first solid electrolyte) is included in the negative electrode. The reason for this is that, in the all-solid battery, lithium ions may be transferred to the active material only when the solid electrolyte is included in the electrode. The solid electrolyte may be included in an amount of 1 wt % to 50 wt % based on the total weight of the negative electrode active material layer.

The solid electrolyte may be an inorganic solid electrolyte or an organic solid electrolyte.

The inorganic solid electrolyte may include an oxide-based inorganic solid electrolyte, a phosphate-based inorganic solid electrolyte, a nitride-based inorganic solid electrolyte, a sulfide-based inorganic solid electrolyte, or a mixture thereof.

The oxide-based inorganic solid electrolyte may include lithium-lanthanum-titanium oxide (LLTO), lithium-lanthanum-zirconium oxide (LLZO), LISICON, or a mixture thereof, the phosphate-based inorganic solid electrolyte may include any one selected from the group consisting of lithium-aluminum-titanium-phosphate (LATP), lithium-aluminum-germanium-phosphate (LAGP), and a mixture thereof, the nitride-based inorganic solid electrolyte may include LiPON (lithium phosphorous oxynitride), and the sulfide-based inorganic solid electrolyte may include $Li_{10}GeP_2S_{12}$, $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z is any one of germanium (Ge), Zn, and gallium (Ga)), $Li_2S$—$GeS_2$, $Li_2S$—$SiS_2$—$Li_3PO_4$, $Li_2S$—$SiS_2$—$Li_xMO_y$ (where x and y are positive numbers, and M is any one of phosphorus (P), Si, Ge, boron (B), Al, Ga, and indium (In)), and a mixture thereof.

The organic solid electrolyte may be a polymer electrolyte formed by adding a polymer resin to a solvated lithium salt, and the polymer resin may include one selected from the group consisting of a polyether-based polymer, a polycarbonate-based polymer, an acrylate-based polymer, a polysiloxane-based polymer, a phosphazene-based polymer, a polyethylene derivative, polyethylene oxide (PEO), polyethylene glycol, an alkylene oxide derivative, a phosphate ester polymer, polyalginate lysine, polyester sulfide, polyvinyl alcohol, polyvinylidene fluoride, and a polymer containing an ionic dissociation group, or a mixture of two or more thereof.

Preparation of Lithium Foil

In order to prepare the lithium secondary battery of the present invention, a closed band shaped lithium foil 200, in which an opening 202 is formed at a center, is prepared.

Figure 1:
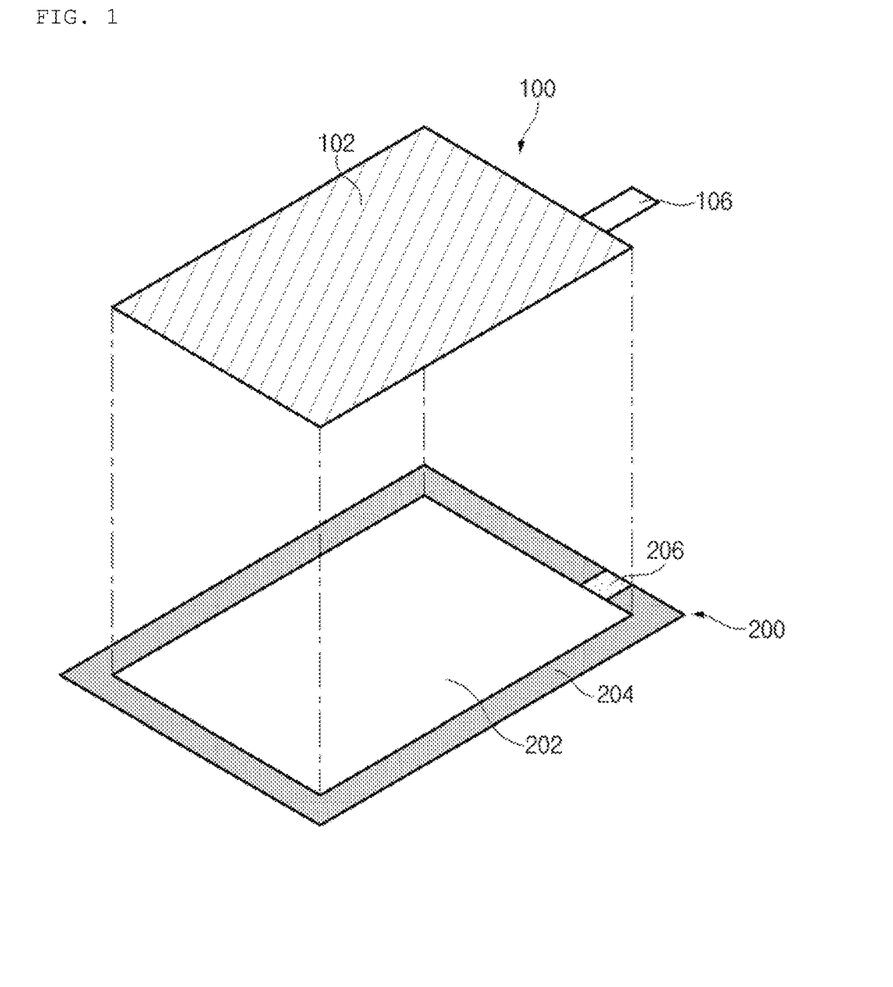
FIG. 1 is a schematic view illustrating disposition of a negative electrode in a center opening of a square band-shaped lithium foil in a method of preparing a lithium secondary battery of the present invention.

The opening 202 may be prepared so as to have the same size and shape as the negative electrode 100 except for the negative electrode tab 106, and the lithium foil 200 may be prepared by coating lithium on a copper foil having a desired shape. In FIG. 1, the lithium foil 200 includes a lithium-coated portion 204 and a lithium-uncoated portion 206, wherein portions in contact with the negative electrode 100 and the negative electrode tab 106 are not coated with lithium.

The negative electrode 100 does not overlap the lithium foil 200 except for the negative electrode tab 106, but an outer boundary of the negative electrode 100 does not overlap an inner boundary of the lithium foil 200.

The lithium foil 200 is prepared such that a size thereof is not greater than a solid electrolyte-coated portion to be described later and a thickness thereof is not greater than a thickness of the negative electrode.

Preparation of All-Solid Lithium Secondary Battery (Use Solid Electrolyte)

The negative electrode 100 is disposed in the opening 202 of the above-described lithium foil 200, but the negative electrode 100 except for the negative electrode tab 106 and the lithium foil 200 are disposed so as not to overlap with each other, and the negative electrode tab 106 is disposed so as to be in contact with the lithium foil 200.

Figure 2:
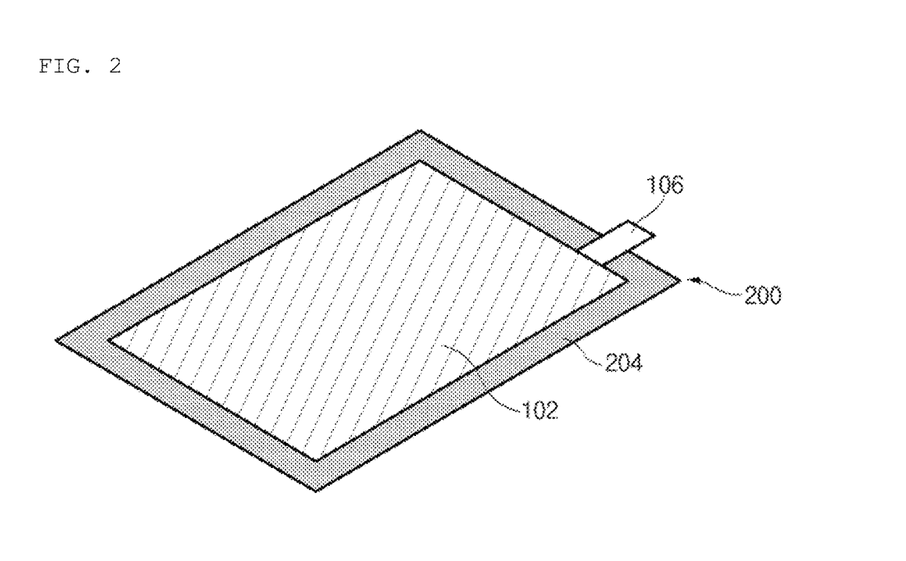
FIG. 2 is a schematic view illustrating the disposition of the negative electrode in the center opening of the square band-shaped lithium foil.

A resultant product, in which the negative electrode 100 is disposed in the opening 202 of the lithium foil 200 as described above, is illustrated in FIG. 2.

Figure 3:
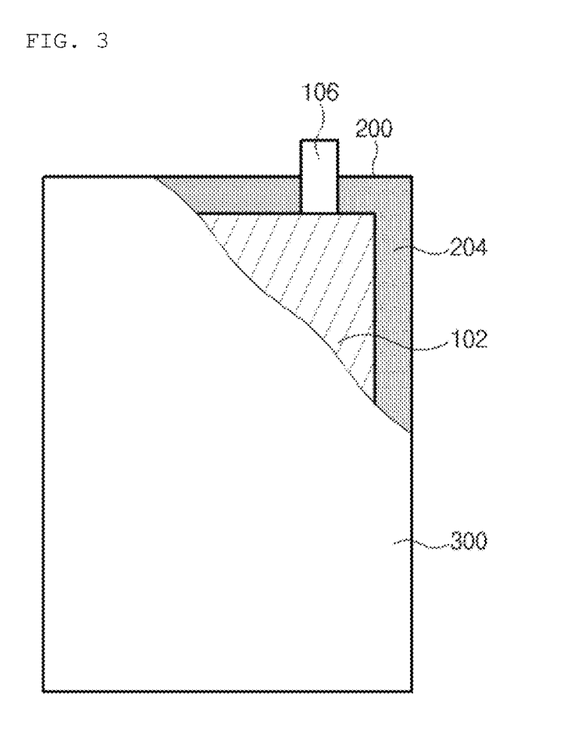
FIG. 3 is a schematic plan view illustrating a structure, in which the closed square band-shaped lithium foil having the opening formed at the center thereof; the negative electrode; and a solid electrolyte or a separator are stacked, in the method of preparing a lithium secondary battery of the present invention.

Then, a solid electrolyte (second solid electrolyte) 300 is disposed by being applied to at least one surface of the structure formed (structure of FIG. 2) (see FIG. 3).

The solid electrolyte 300 acts as both an electrolyte and a separator in an all-solid lithium secondary battery, wherein one selected from the solid electrolyte (first solid electrolyte) compounds, which may be included in the above-described negative electrode, may be used, and these may be the same or different from each other.

Figure 4:
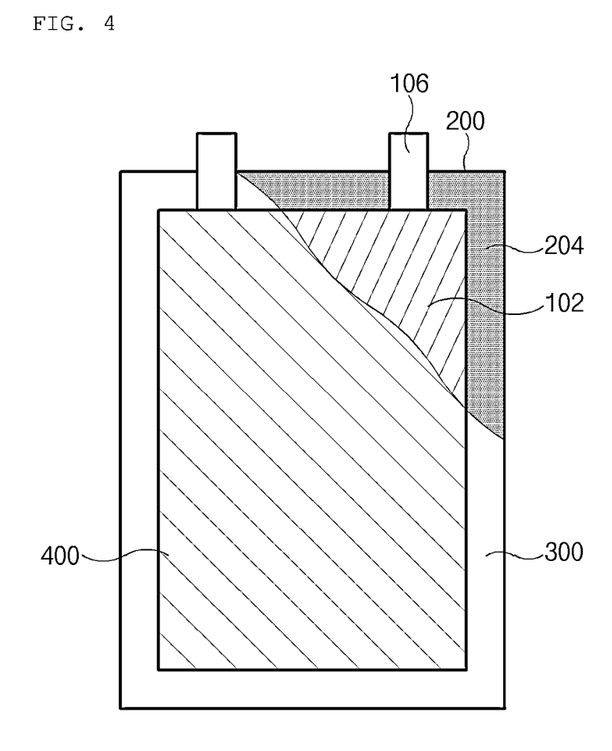
FIG. 4 is a schematic plan view illustrating a structure, in which the positive electrode is disposed on the solid electrolyte or the separator to form a stack, in the method of preparing a lithium secondary battery of the present invention.

Next, a positive electrode (400) is disposed on the solid electrolyte (300) applied (see FIG. 4).

The positive electrode includes a positive electrode collector and a positive electrode active material layer disposed on at least one surface of the positive electrode collector.

The positive electrode may be prepared according to a conventional positive electrode preparation method generally known in the art. For example, the positive electrode may be prepared by a method in which a positive electrode slurry is prepared by dissolving or dispersing components constituting the positive electrode active material layer, that is, a positive electrode active material, a conductive agent, and/or a binder in a solvent, and at least one surface of the positive electrode collector is coated with the positive electrode slurry, dried, and then pressed, or may be prepared by casting the positive electrode slurry on a separate support and then laminating a film separated from the support on the positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve adhesion of the positive electrode active material. The positive electrode collector, for example, may be used in various forms such as that of a film, a sheet, a foil, a net, a porous body, a foam body, a non-woven fabric body, and the like.

As the positive electrode active material, for example, a layered compound, such as lithium cobalt oxide ($LiCoO_2$) and lithium nickel oxide ($LiNiO_2$), or a compound substituted with at least one transition metal; lithium manganese oxides such as $Li_{1+y}Mn_{2-y}O_4$ (where y is 0 to 0.33), $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxide represented by the chemical formula $LiNi_{1-y}M_yO_2$ (where M=cobalt (Co), manganese (Mn), Al, copper (Cu), iron (Fe), magnesium (Mg), B, or Ga, and y is 0.01 to 0.3); lithium manganese composite oxide represented by the chemical formula $LiMn_{2-y}M_yO_2$ (where M=Co, nickel (Ni), Fe, chromium (Cr), Zn, or tantalum (Ta), and y is 0.01 to 0.1) or $Li_2Mn_3MO_8$ (where M=Fe, Co, Ni, Cu, or Zn); $LiMn_2O_4$ having a part of Li being substituted with alkaline earth metal ions; a disulfide compound; or $Fe_2(MoO_4)_3$ may be used, but the positive electrode active material is not limited thereto.

Also, the binder and the conductive agent may be the same as those previously described in the negative electrode.

In a case in which the positive electrode is used as a positive electrode of an all-solid lithium secondary battery, a solid electrolyte (third solid electrolyte) is included in the positive electrode. The reason for this is that, in the all-solid battery, lithium ions may be transferred to the active material only when the solid electrolyte is included in the electrode.

One selected from the solid electrolyte (first solid electrolyte) compounds, which may be included in the above-described negative electrode, may be used as the solid electrolyte, and these may be the same or different from each other.

Figure 5:
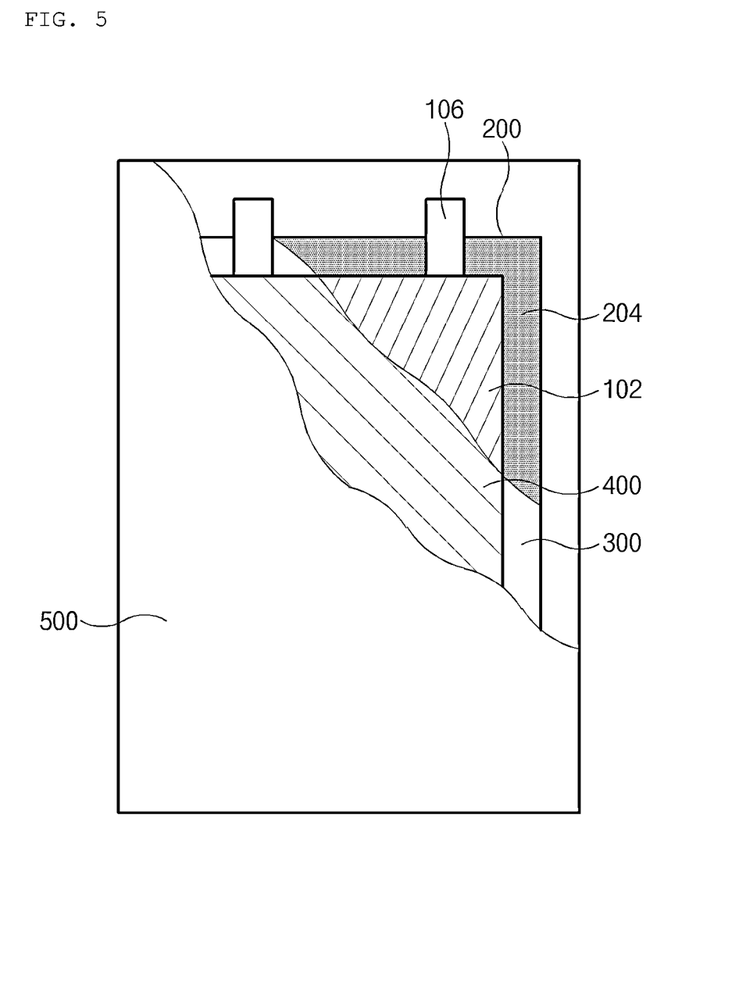
FIG. 5 is a schematic plan view illustrating a structure, in which the stack is accommodated in a battery case.

The all-solid lithium secondary battery of the present invention may be prepared by accommodating (casing) the prepared stack in a battery case (500) (see FIG. 5).

Since pre-lithiation of the all-solid lithium secondary battery of the present invention occurs through aging after the casing, the all-solid lithium secondary battery of the present invention is advantageous in that the pre-lithiation may be performed without a separate pre-lithiation process.

The aging may be performed at a temperature of 10° C. to 200° C. and a pressure of 1 bar to 5,000 bar for 2 hours to 48 hours.

If the aging temperature and time are less than 10° C. and less than 2 hours, respectively, the pre-lithiation may not be sufficiently performed, and, since the lithium metal melts at a temperature of greater than 200° C., it may be difficult to maintain its shape. Since 48 hours is sufficient to complete the pre-lithiation, it is not necessary to age the negative electrode for greater than 48 hours. The reason for applying the pressure is to facilitate the ion transfer by reducing interfacial resistance in the all-solid battery, and a pressure within the above pressure range is suitable for this purpose.

As described above, the all-solid lithium secondary battery denotes a battery in which a liquid or polymer electrolyte used in a conventional lithium secondary battery is replaced with a solid electrolyte material, wherein, since a flammable solvent is not used in the battery, it is chemically stable and, simultaneously, ignition or explosion caused by a leakage or decomposition reaction of a conventional electrolyte solution does not occur at all, and thus, safety may be greatly improved. Also, since a Li metal or Li alloy may be used as a negative electrode material, it is advantageous in that energy density with respect to mass and volume of the battery may be significantly improved. Furthermore, it is suitable for achieving high energy density by stacking the electrode and the solid electrolyte.

That is, according to the above-described preparation method of the present invention, an all-solid lithium secondary battery, which has the advantages of the all-solid lithium secondary battery and may be subjected to pre-lithiation without a separate process at the same time, may be prepared.

Preparation of Lithium Secondary Battery (Use Liquid Electrolyte)

The negative electrode is disposed in the opening of the above-described lithium foil, but the negative electrode and the lithium foil are disposed so as not to overlap with each other, and the negative electrode tab is disposed so as to be in contact with the lithium foil (this process is the same as the disposition of the negative electrode in the opening of the lithium foil during the preparation of the above-described all-solid lithium secondary battery). In this case, the lithium foil is prepared such that a size thereof is not greater than the separator 300 to be described later and a thickness thereof is not greater than the thickness of the negative electrode.

Then, the separator 300 is disposed on at least one surface of the structure formed.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Next, a positive electrode (400) is disposed on the separator (300) (see FIG. 4).

The same positive electrode used in the above-described all-solid battery may be used as the positive electrode, but it is not necessary to include a solid electrolyte.

Figure 6:
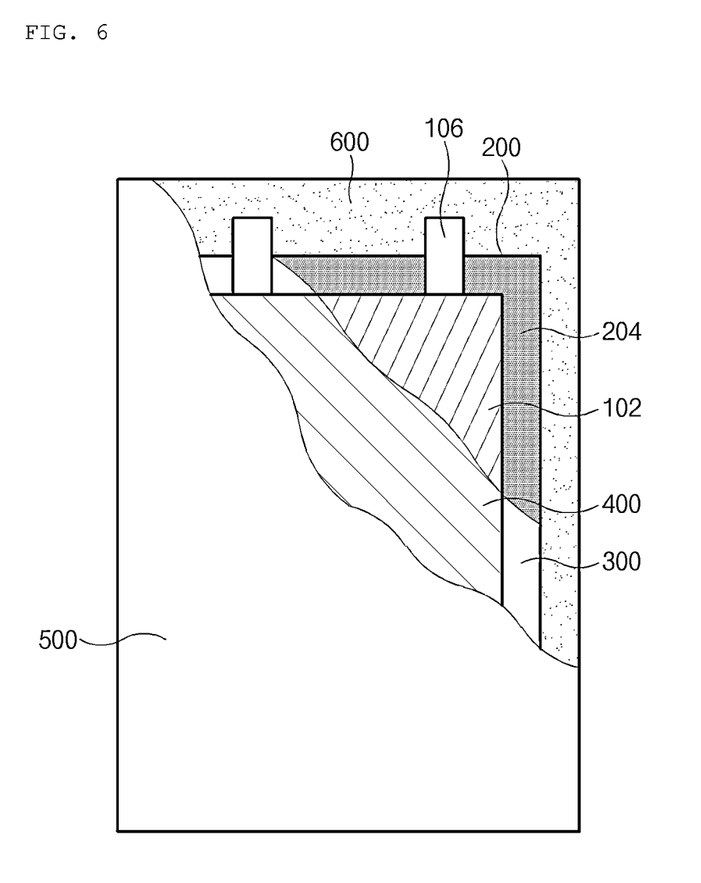
FIG. 6 is a schematic plan view illustrating a structure, in which the liquid electrolyte is injected into the battery case.

After disposing the positive electrode (400), the lithium secondary battery of the present invention may be prepared by accommodating the above-prepared stack in a battery case (500) and injecting a liquid electrolyte (600) into the battery case (500) (see FIG. 6).

The liquid electrolyte is mainly an organic liquid electrolyte, wherein it may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as Ra—CN (where Ra is a linear, branched, or cyclic hydrocarbon group having 2 to 20 carbon atoms and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate; pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the liquid electrolyte in addition to the liquid electrolyte components. In this case, the additive may be included in an amount of 0.1 wt % to 5 wt % based on a total weight of the electrolyte.

After injecting the liquid electrolyte, since pre-lithiation is performed by impregnating with an electrolyte solution at a temperature of 10° C. to 200° C. for 2 hours to 48 hours, lithium of the lithium foil may be diffused into the negative electrode.

The impregnation may be performed at a temperature of 20° C. to 70° C. for 2 hours to 36 hours.

If the impregnation temperature and time are less than 10° C. and less than 2 hours, respectively, the pre-lithiation may not be sufficiently performed, and, since the lithium metal melts at a temperature of greater than 200° C., it may be difficult to maintain its shape. Since 48 hours is sufficient to complete the pre-lithiation, it is not necessary to impregnate the negative electrode for greater than 48 hours.

Although the lithium secondary battery according to the present invention has been described mainly in the form of a mono-cell, it is applicable to various types of lithium secondary batteries.

Specifically, the lithium secondary battery of the present invention may be prepared by a winding process, or may be prepared by a lamination, stack, and/or folding process of the separator and the electrode. Also, the lithium secondary battery of the present invention may be applied to all types, such as a cylindrical type, a prismatic type, a coin type, and a pouch type, according to the shape of a case, and may, for example, be a jelly-roll type, a stacked type, a stack-folding type (including stack-Z-folding type), or a lamination-stack type according to the form accommodated in the case.

EXAMPLES

Hereinafter, the present invention will be described in detail, according to examples. However, the following examples are merely presented to exemplify the present invention, not to limit the scope of the present invention.

Example 1. Preparation of All-Solid Lithium Secondary Battery

A negative electrode active material slurry was prepared by adding 80 wt % of a negative electrode active material (graphite), 3 wt % of a conductive agent (Denka black), 3.5 wt % of a binder (SBR), 1.5 wt % of a thickener (CMC), and a solid polymer electrolyte (PEO6:LiTFSI) to acrylonitrile (AN). Both surfaces of a copper current collector were coated with the prepared negative electrode active material slurry, dried, and pressed to prepare a negative electrode, and the negative electrode was then punched out into a circular shape.

A lithium foil was prepared by coating lithium on a copper foil by a roll press method, and a closed circular band-shaped lithium foil, which had an opening having the same shape and size as the negative electrode, was prepared.

The prepared negative electrode was disposed in the opening of the lithium foil prepared.

After PEO6:LiTFSI, as a solid electrolyte, was coated on a top surface of the negative electrode of the above-prepared structure to a thickness of 0.1 mm, pressure was applied to bond the negative electrode and the solid electrolyte. Then, a $LiCoO_2$ positive electrode [similar to the negative electrode, the solid polymer electrolyte (PEO6:LiTFSI) was also included in the positive electrode] was disposed on a top surface of the solid electrolyte and then pressurized to bond the positive electrode. A stack in the form of positive electrode/solid polymer electrolyte/negative electrode (disposed in the opening of the lithium foil) was prepared through the above cell preparation process and accommodated in a coin cell to prepare a coin-type full cell.

The full cell was aged at a temperature of 60° C. for 12 hours under a pressure of 250 bar to perform pre-lithiation.

Example 2. Preparation of Lithium Secondary Battery Using Liquid Electrolyte

A negative electrode active material slurry was prepared by adding 92 wt % of a negative electrode active material (graphite:SiO=7:3), 3 wt % of a conductive agent (Denka black), 3.5 wt % of a binder (SBR), and 1.5 wt % of a thickener (CMC) to water. Both surfaces of a copper current collector were coated with the prepared negative electrode active material slurry, dried, and pressed to prepare a negative electrode, and the negative electrode was then punched out into a circular shape.

A lithium foil was prepared by coating lithium on a copper foil by a roll press method, and a closed circular band-shaped lithium foil, which had an opening having the same shape and size as the negative electrode, was prepared.

The prepared negative electrode was disposed in the opening of the lithium foil prepared.

After a polyolefin separator was disposed between the above-prepared structure and the $LiCoO_2$ positive electrode, this stack was accommodated in a coin cell. Then, an electrolyte solution, in which 2 wt % of FEC was added to a solvent, in which EC and EMC were mixed in a volume ratio of 3:7, and $LiPF_6$ was dissolved in a concentration of 1 M, was injected into the coin cell to prepare a coin-type full cell.

For pre-lithiation, the full cell was allowed to be impregnated in the electrolyte solution at room temperature for 12 hours.

Comparative Example 1

A coin-type full cell was prepared in the same manner as in Example 1 except that the band-shaped lithium foil having an opening was not used.

Comparative Example 2

A coin-type full cell was prepared in the same manner as in Example 2 except that the band-shaped lithium foil having an opening was not used.

Experimental Example 1. Cycle Charge/Discharge Test

Reversibility test was performed on the coin-type full cells prepared in the examples and the comparative examples using an electrochemical charger/discharger. The coin-type full cells were charged by applying a current at a current density of 0.1 C-rate to a voltage of 4.2 V (vs. $Li/Li^+$) during charge and discharged at the same current density to a voltage of 2.5 V during discharge, and first cycle charge/discharge efficiencies (initial efficiency, %) are presented in Table 1 below. In this case, the initial efficiency was calculated by the following equation.

With respect to Example 1 and Comparative Example 1 in which the solid electrolyte was used, the charge/discharge test was performed at 60° C., and, with respect to Example 2 and Comparative Example 2 in which the liquid electrolyte was used, the charge/discharge test was performed at room temperature.

Initial efficiency (%)=(discharge capacity in the first cycle/charge capacity in the first cycle)×100

TABLE 1

|  | First cycle charge/discharge efficiency (%) |
| --- | --- |
| Example 1 | 85 |
| Example 2 | 86 |
| Comparative Example 1 | 64 |
| Comparative Example 2 | 80 |

As illustrated in Table 1, it may be confirmed that initial reversible efficiencies of Examples 1 and 2 were significantly higher than those of Comparative Examples 1 and 2, wherein the reason for this is considered that pre-lithiation, in which lithium in the lithium foil layer was transferred to the active material layer of the negative electrode, occurred without a complicated process.

DESCRIPTION OF THE SYMBOLS

100: Negative electrode
102: Negative electrode active material layer
106: Negative electrode tab
200: Lithium foil
202: Opening
204: Lithium-coated portion
206: Lithium-uncoated portion
300: Applied solid electrolyte or separator
400: Positive electrode
500: Battery Case
600: Liquid electrolyte

The invention claimed is:

1. A method of preparing a lithium secondary battery, the method comprising:
    preparing a negative electrode by forming a negative electrode active material layer on opposite surfaces of a current collector, the negative electrode having a negative electrode tab;
    preparing a lithium foil having an opening formed at a center thereof and having a closed band shape, in which lithium is coated on one surface or opposite surfaces of a copper foil;
    disposing the negative electrode in the opening of the lithium foil such that the negative electrode does not to overlap the lithium foil except for the negative electrode tab such that the negative electrode tab contacts the lithium foil, and preventing a portion, where the negative electrode tab and the lithium foil are in contact with each other, from being coated with the lithium;
    disposing a separator on at least one surface of a structure formed after disposing the negative electrode in the opening of the lithium foil;
    disposing a positive electrode on the separator to form a stack; and
    accommodating the stack in a battery case, and injecting a liquid electrolyte into the battery case to form a solid electrolyte interface (SEI) at initial stage of charging to prevent a reaction of the lithium ions with the negative electrode or other materials during charging and discharging.

2. The method of claim 1, wherein the separator is a polyolefin-based porous polymer film or a porous nonwoven fabric.

3. The method of claim 1, wherein the lithium foil has a size not greater than the separator and has a thickness not greater than a thickness of the negative electrode.

4. The method of claim 1, further comprising impregnating with an electrolyte solution at a temperature of 10° C. to 200° C. for 2 hours to 48 hours, after the accommodating of the stack in the battery case and the injecting of the liquid electrolyte into the battery case.

5. The method of claim 1, wherein the opening has a same size and shape as the negative electrode expect for the negative tab.

6. The method of claim 1, wherein the current collector includes the negative electrode tab such that the negative electrode tab protrudes from the current collector.

* * * * *